(12) United States Patent
Sullivan et al.

(10) Patent No.: US 8,356,485 B2
(45) Date of Patent: Jan. 22, 2013

(54) SYSTEM AND METHOD FOR OXYGEN SEPARATION IN AN INTEGRATED GASIFICATION COMBINED CYCLE SYSTEM

(75) Inventors: Terrence B. Sullivan, Orlando, FL (US); David J. Huber, Tequesta, FL (US)

(73) Assignee: Siemens Energy, Inc., Orlando, FL (US)

( * ) Notice: Subject to any disclaimer, the term of this patent is extended or adjusted under 35 U.S.C. 154(b) by 1016 days.

(21) Appl. No.: 11/711,825

(22) Filed: Feb. 27, 2007

(65) Prior Publication Data
US 2008/0202123 A1 Aug. 28, 2008

(51) Int. Cl.
*F02C 3/28* (2006.01)
*F02C 6/04* (2006.01)
*F02C 7/14* (2006.01)
*F02C 3/30* (2006.01)

(52) U.S. Cl. ............. 60/780; 60/39.12; 60/784; 60/728; 60/39.182

(58) Field of Classification Search ............ 60/780, 60/39.12, 39.182, 726, 782, 784, 785, 781
See application file for complete search history.

(56) References Cited

U.S. PATENT DOCUMENTS

| | | | | |
|---|---|---|---|---|
| 4,184,322 A | * | 1/1980 | Paull et al. ................. | 60/780 |
| 4,906,376 A | | 3/1990 | Fyles | |
| 5,041,224 A | | 8/1991 | Ohyama et al. | |
| 5,240,473 A | | 8/1993 | Carolan et al. | |
| 5,394,686 A | * | 3/1995 | Child et al. ................. | 60/39.12 |
| 5,657,624 A | | 8/1997 | Kang et al. | |
| 5,776,325 A | | 7/1998 | Partridge | |
| 5,954,859 A | | 9/1999 | Keskar et al. | |
| 5,964,922 A | | 10/1999 | Keskar et al. | |

(Continued)

FOREIGN PATENT DOCUMENTS

| | | |
|---|---|---|
| EP | 0773416 A2 | 5/1997 |
| EP | 1 027 916 A1 | 8/2000 |

(Continued)

OTHER PUBLICATIONS

Paul N, Dyer, Robin E. Richards, Steven L. Russek, Dale M. Taylor; "Ion transport membrane technology for oxygen separation and syngas production"; Solid State Ionics, Oct. 1, 2000; pp. 21-33; vol. 134, No. 1-2; XP004238106; ISSN: 0167-2738; North Holland Pub. Company, Amsterdam, NL.

*Primary Examiner* — Ted Kim (57) ABSTRACT

An integrated gasification combined cycle power generation system (100). In one embodiment, shown in FIG. 1, a gasifier (108) is configured to generate synthetic gas (117) from a carbonaceous material (106) and an oxygen supply (109) with a cleaning stage (120) positioned to receive synthetic gas (117) from the gasifier (108) and remove impurities therefrom. A gas turbine combustion system (2) including a turbine (123) is configured to receive fuel (128) from the gasifier (108) and a first air supply (131) from a first air compressor (130). A steam turbine system (4) is configured to generate power with heat recovered from exhaust (140) generated by the gas turbine system (2) and an ion transport membrane air separation unit (110) includes a second air compressor (114) for generating a second air supply (113). A first heat exchanger (118) is configured to cool the synthetic gas (117) prior to removal of impurities in the cleaning stage (120) by flowing the second air supply (113) through the first heat exchanger (118) so that the second air supply (113) receives heat from the synthetic gas (117).

6 Claims, 5 Drawing Sheets

U.S. PATENT DOCUMENTS

| | | | |
|---|---|---|---|
| 6,139,604 | A | 10/2000 | Gottzmann et al. |
| 6,235,187 | B1 | 5/2001 | Anderson et al. |
| 6,293,084 | B1 | 9/2001 | Drnevich et al. |
| 6,565,632 | B1 | 5/2003 | van Hassel et al. |
| 6,637,183 | B2 * | 10/2003 | Viteri et al. ............... 60/39.182 |
| 6,948,318 | B2 * | 9/2005 | Peyron ..................... 60/39.12 |
| 2002/0174659 | A1 * | 11/2002 | Viteri et al. ............... 60/39.12 |
| 2003/0039601 | A1 | 2/2003 | Halvorson et al. |
| 2004/0011057 | A1 * | 1/2004 | Huber ...................... 60/39.12 |
| 2004/0021240 | A1 | 2/2004 | Chen et al. |
| 2004/0221722 | A1 | 11/2004 | Prasad et al. |
| 2005/0013933 | A1 | 1/2005 | Chen et al. |
| 2005/0031531 | A1 | 2/2005 | Stein et al. |
| 2008/0115478 | A1 * | 5/2008 | Sullivan .................... 60/39.12 |

FOREIGN PATENT DOCUMENTS

| | | |
|---|---|---|
| JP | 4 156265 | 5/1992 |
| WO | 03049122 A2 | 6/2003 |
| WO | WO 2005/023407 A2 | 3/2005 |
| WO | 2008012117 A1 | 1/2008 |

\* cited by examiner

SYSTEM AND METHOD FOR OXYGEN SEPARATION IN AN INTEGRATED GASIFICATION COMBINED CYCLE SYSTEM

FIELD OF THE INVENTION

The present invention relates generally to power generation systems, and more particularly, to integrated gasification combined cycle systems.

BACKGROUND OF THE INVENTION

Integrated Gasification Combined Cycle ("IGCC") systems are an economically attractive alternative to conventional fossil fuel power plants. They present an opportunity to deploy coal, an abundant resource, in an economical and clean manner, bringing improved efficiency over conventional coal-burning steam turbine power generation.

In an IGCC system, a carbonaceous fuel such as coal is converted to a synthetic gas fuel, termed syngas, a mixture formed by partial oxidation at elevated temperatures. Syngas comprises carbon monoxide, hydrogen, and other gaseous constituents. Oxygen-blown gasifiers typically source oxygen from cryogenic Air Separation Units (ASUs) or from Ion Transport Membrane (ITM) Air Separation Units. Cryogenic ASUs employ a combination of compressors, heat exchangers, valves, and distillation columns to effect the separation of oxygen from air at very low temperatures. The cryogenic air separation process consumes significant quantities of electric power, reducing the net plant output and efficiency.

In an ITM air separation process, oxygen molecules in high temperature air, generally in the range of 1400°-1700° F. (760-927 C), are converted to oxygen ions on the cathode side of the membrane, and are transported through the membrane under an applied voltage or pressure differential relative to the anode side of the membrane. Oxygen ions lose electrons on the anode side, reforming into oxygen molecules, with the electrons migrating to the cathode side of the membrane to again ionize oxygen. The membrane elements, being manufactured from ceramic materials, are permeable to oxygen ions at elevated temperatures.

BRIEF DESCRIPTION OF THE DRAWINGS

Features of the invention will be best understood when the following detailed description is read in conjunction with the accompanying drawings, wherein FIGS. 1-5 each illustrate an IGCC incorporating an ITM ASU according to an embodiment of the invention.

Like reference numerals are used to reference like features throughout the figures.

DETAILED DESCRIPTION OF THE INVENTION

The invention comprises an IGCC system that integrates an air separation unit with recovery of sensible heat. In one embodiment a power generation system 100, shown in FIG. 1 comprises a gasification system 1, a gas turbine system 2, a Heat Recovery Steam Generator (HRSG) 3, and a steam turbine system 4, each of which may be configured in a conventional manner. The gasification system 1 includes a hydrocarbon fuel source 106, such as a coal slurry, a gasifier 108, an ITM air separation unit 110, an air compressor 114, a syngas cooler 118 and a gas cleaning stage 120. The gas turbine system 2 includes an air-compressor 130, a combustor 132, a gas turbine 134, and an electrical generator 136. The HRSG 3 comprises an economizer 172, a steam drum 174, an evaporator 176 and a super heater 178. The steam turbine system 4 includes a steam chest 152, a steam turbine 160, an electrical generator 162, a condenser 164 and a feed-water pump 166.

Oxygen 109 is provided to the gasifier 108 from the ITM ASU 110 which receives high temperature, high pressure air 113 from the syngas cooler 118. The compressor 114 driven by a motor 116 intakes ambient air 115 to provide a source of high pressure air 113 to the syngas cooler 118. The compressed air 113 may be delivered from the stand-alone compressor 114 shown in FIG. 1, or from a compressor 130 of the gas turbine system 2, or from another source. The ITM ASU 110 produces the high purity oxygen 109 while operating in a temperature range of about 1400°-1700° F. (760-927 C) and with an oxygen partial pressure differential across the membrane of 200 to 400 psia (1378.6 kPa-2757.2 kPa). The membrane operating temperature is achieved by flowing the air stream 113 through the syngas cooler 118 so that sensible heat present in hot syngas 117 exiting the gasifier 108 heats the air stream 113. After being separated from the air 113 in the ASU 110, oxygen 109 is delivered to the gasifier 108 and oxygen-depleted air 127 may, as shown, be delivered to the fuel line 125 for addition to the fuel mixture 128. Although not shown, the syngas cooler 118 may include an additional heat exchanger to generate steam from a portion of the feed-water 167 exiting the steam turbine system 4.

Figure 1:
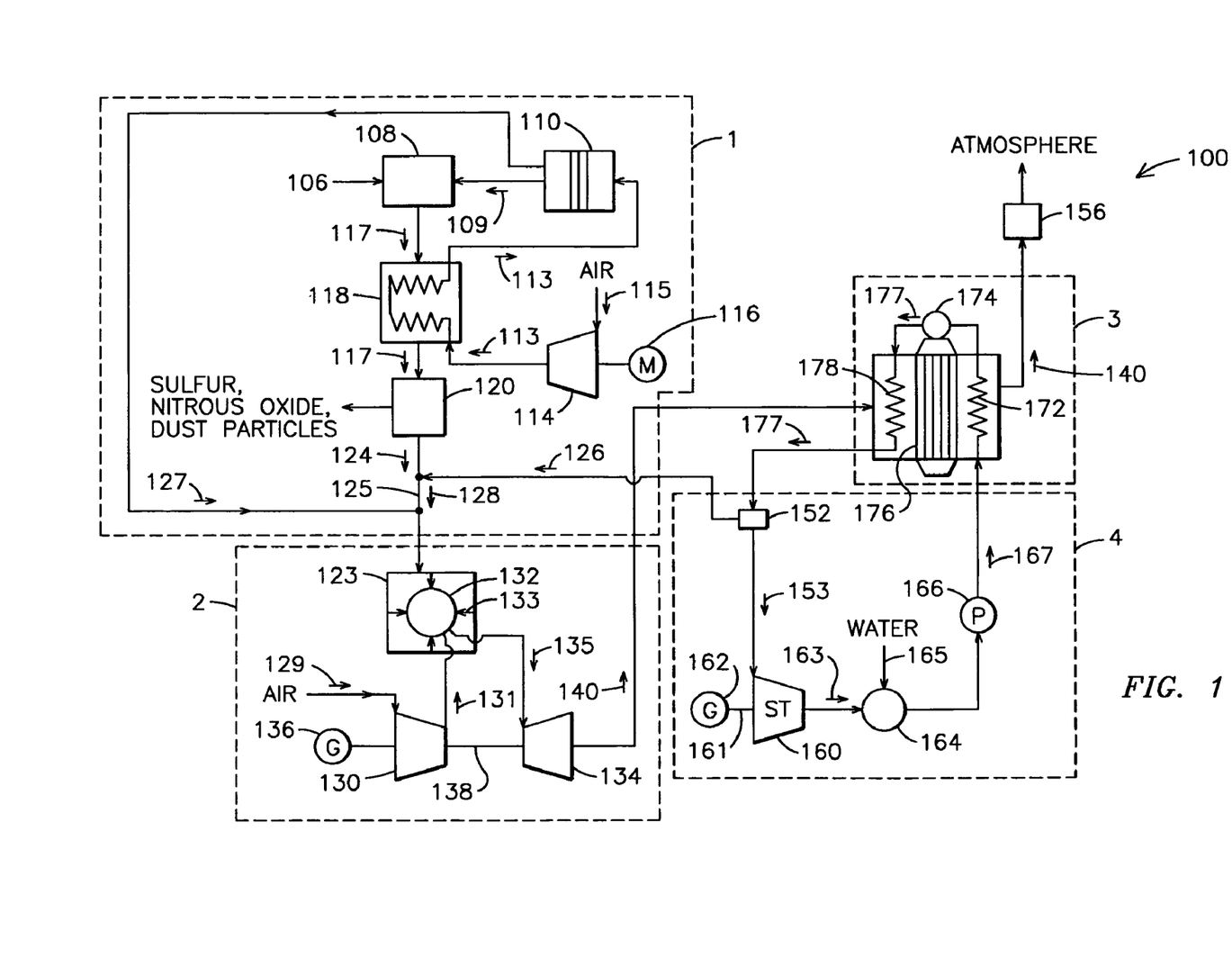

In the gasifier 108, the hydrocarbon fuel 106 undergoes partial oxidation to generate primarily carbon monoxide and hydrogen in an exothermic reaction, with the hot syngas 117 exiting the gasifier 108, generally in the temperature range of about 2000°-2800° F. (1093-1538 C). To meet air quality requirements, impurities such as sulfur, nitrous compounds, and dust particles are removed in the gas cleaning stage 120. The syngas cooler 118 reduces the syngas temperature before introduction of the syngas 117 to the gas cleaning stage 120. The cleaned syngas 124 is mixed with steam 126 from the steam chest 152. Steam 126 can be used to regulate the combustion process temperature, the internal combustor temperature profile, and the combustor exit temperature by varying the steam flow rate. The mixture 128 of steam 126 and syngas 124 flows through a fuel supply line 125 to the fuel manifold 123 and into the combustor 132 of the gas turbine system 2. The mixture 128 may also include nitrogen or oxygen-depleted air 127 from the air separation unit 110 to reduce flame temperature and $NO_x$ formation.

During operation of the power plant 100, the compressor 130 inducts ambient air 129, producing compressed air 131 which is directed to the combustor 132. The compressed air 131 may be oxygen enriched. The fuel mixture 128 enters the manifold 123 and passes through multiple ports 133 thereof, into the combustor 132 where the fuel mixture 128 reacts with the compressed air 131 to produce a hot, pressurized gas 135 which enters the gas turbine 134 where it expands, thereby producing power in the rotor shaft 138 to drive both the compressor 130 and the electrical generator 136. As a result of having been expanded in the turbine 134, a low temperature, low pressure gas 140 is exhausted from the turbine 134. The expanded gas 140 exhausted from the turbine 134, typically in the range of 850°-1100° F. (454-593 C), is directed to the HRSG 3 for further recovery of heat. Feed-water 167 sent from the steam turbine system 4 by a pump 166 is heated in the HRSG 3 by the relatively hot gas 140 flowing therethrough. The cooled, expanded gas 140 exiting the HRSG 3 is then discharged to atmosphere via a stack 156. The feed-water 167 first flows through the heat transfer tubes of the economizer 172, where its temperature is raised to near the boiling point and is then directed to the steam drum 174. The heated water is then circulated through the heat transfer tubes of the evaporator 176 where it is converted into saturated steam 177. The steam temperature is further elevated as it flows through the superheater 178 prior to entry into the steam chest 152. Steam 153 from the steam chest 152 is directed to the steam turbine 160. Steam 126 from the steam chest 152 is injected to the fuel supply line 125 for entry to the fuel manifold 123 as a component of the fuel mixture 128.

Within the steam turbine 160, the steam 153 expands, thereby producing power in the rotor shaft 161 to drive the electrical generator 162. In other designs, the steam turbine 160 may be coupled to the shaft 138 and generator 136 of the gas turbine system 2. After passing through the turbine 160 the cooled, expanded steam 163 enters the condenser 164 for recycling as feed-water 167. Fresh water 165 is supplied to the condenser 164 to compensate for loss of water in the system 100.

Figure 2:
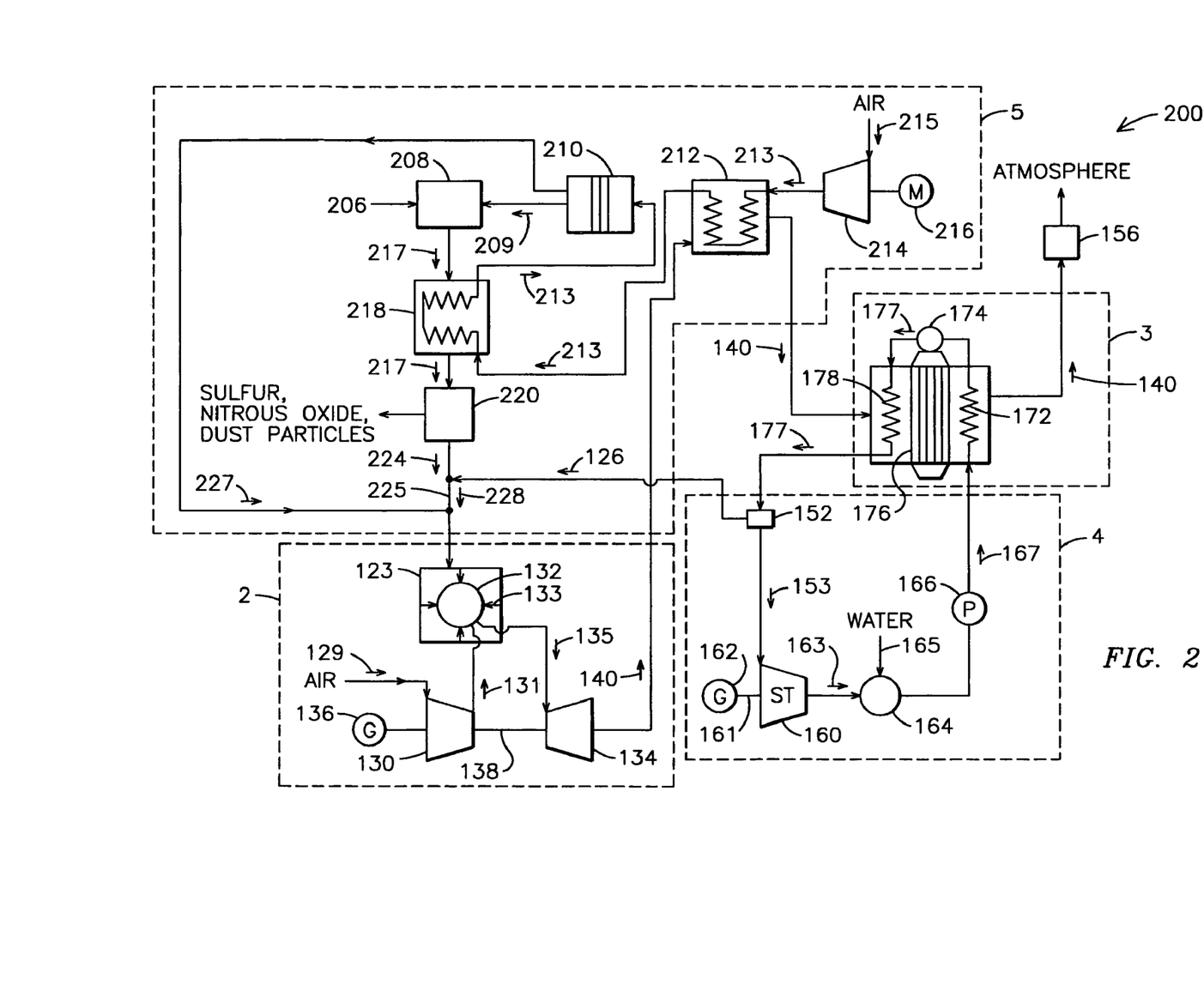

In the embodiment of FIG. 2 a power generation system 200 comprises a gas turbine system 2, a HRSG 3, and a steam turbine system 4 as described with respect to FIG. 1, and a gasification system 5. In the system 200 compressed air being directed to an ITM ASU is preheated in two stages.

The gasification system 5 includes a gasifier 208 which receives a fuel source 206 and an oxygen supply 209 from an ITM ASU 210 to generate syngas 217. The syngas 217 undergoes temperature reduction in the cooler 218 before entering a gas cleaning stage 220 for removal of impurities, e.g., sulfur, nitrous compounds, and dust particles. The cleaned gas 224 is mixed with steam 126 from the steam chest 152 to form a fuel mixture 228 which flows through a fuel supply line 225 to the manifold 123 and into the gas combustor 132 of the gas turbine system 2.

In the gasification system 5 a compressor 214, driven by a motor 216, provides compressed air 213 from a source of ambient air 215. The compressed air 213 may be delivered from the stand-alone compressor 214 shown in FIG. 2, or from a compressor 130 of the gas turbine system 2, or from some other source. The compressed air 213 flows through an air pre-heater 212 to receive sensible heat from the hot gas 140 exiting the gas turbine 134 of the system 2. The cooled gas 140 exiting the pre-heater 212, still relatively hot (typically in the range of 482-583 C), is directed to the HRSG 3 for further recovery of heat. After being heated to a pre-determined temperature (typically in the range of 427-538 C), the compressed air 213 leaves the pre-heater 212 and enters a syngas cooler 218 to facilitate cooling of the syngas 217. Heat transfer to the compressed air 213 occurring in the cooler 218 further elevates the compressed air temperature prior to entry into the ASU 210. The compressed air 213 receives sufficient heat from the syngas 217 to elevate the temperature as required for the ITM process to occur in the ASU 210.

After being separated from the air 213 in the ASU 210, a supply of oxygen 209 is delivered to the gasifier 208 while oxygen-depleted air 227 may, as illustrated, be delivered to the fuel line 225 for addition to the fuel mixture 228. Although not shown, the syngas cooler 218 may include an additional heat exchanger to generate steam from a portion of the feed-water 167.

Figure 3:
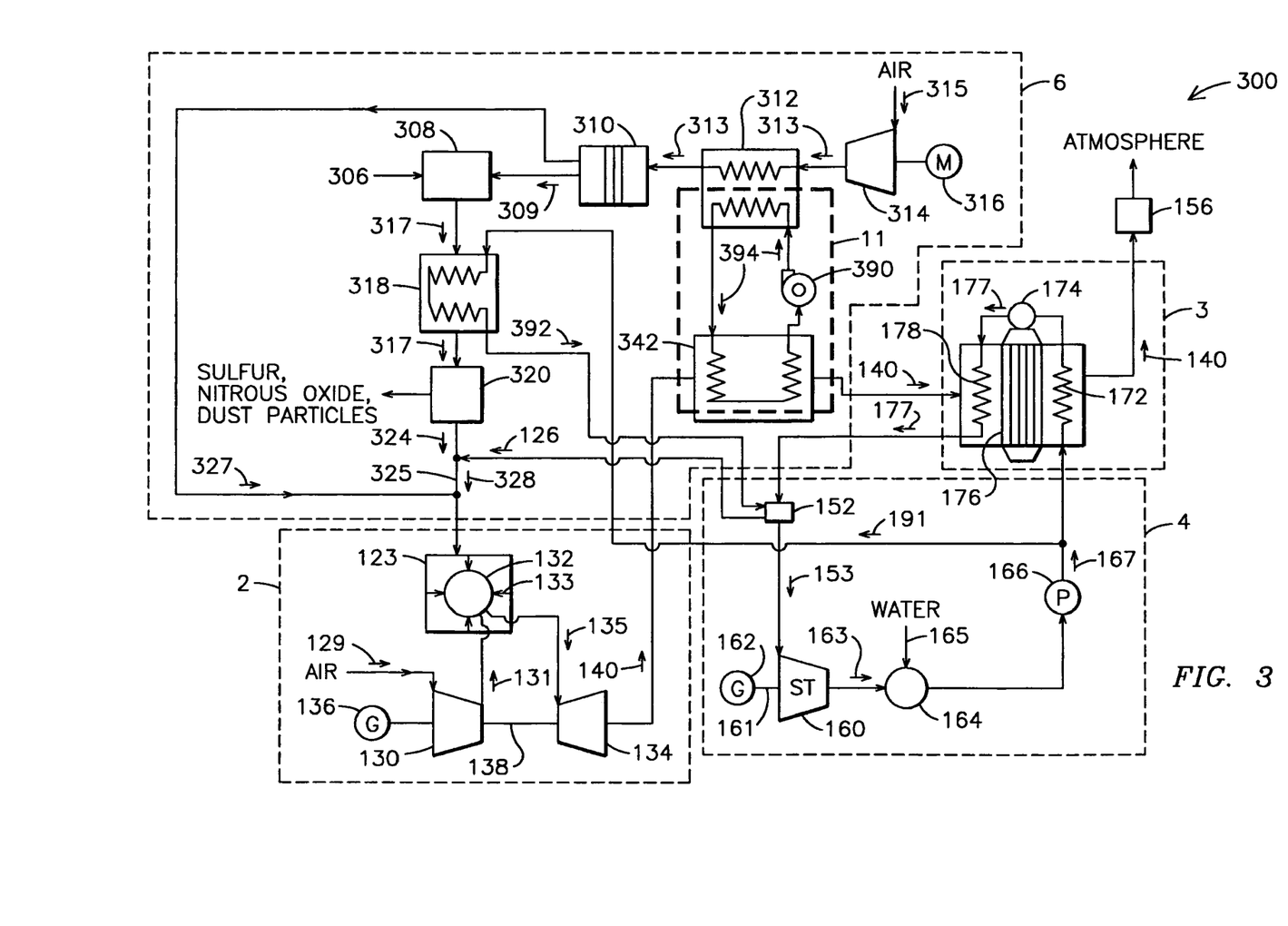

In the embodiment of FIG. 3 a power generation system 300 provides a method of pre-heating compressed air prior to entering an ASU with a closed loop heat exchange system using an intermediate working fluid heated by gas turbine exhaust. The system 300 comprises a gas turbine system 2, a HRSG 3, a steam turbine system 4 as described with respect to FIG. 1, and a gasification system 6. The gasification system 6 includes a gasifier 308 which receives a fuel source 306 and an oxygen supply 309 from an ITM ASU 310. Hot syngas 317 generated in the gasifier 308 is cooled in a syngas cooler 318 using a portion 191 of feed water 167 exiting the steam turbine system 4 before the syngas enters a gas cleaning stage 320 for removal of impurities, e.g., sulfur, nitrous compounds, and dust particles. In the syngas cooler 318 the cooling water 191 is converted to steam 392 which is sent to the steam chest 152. The cleaned syngas 324 is mixed with steam 126 from the steam chest 152 to form a fuel mixture 328 which flows through a fuel supply line 325 to the manifold 123 and into the gas combustor 132 of the gas turbine system 2.

In the gasification system 6 a compressor 314, driven by a motor 316, provides compressed air 313 from a source of ambient air 315. The compressed air 313 may be delivered from the stand-alone compressor 314 shown in FIG. 3, or from a compressor 130 of the gas turbine system 2, or from another source. In the heat exchange system 11 the compressed air 313 flows through an air pre-heater 312 for heat exchange with a hot working fluid 394. The 394 circulates in a closed loop between the air pre-heater 312 and a heat exchanger 342 with assistance of a pump 390. The working fluid 394 may be pure water or may predominately comprise water. Other suitable fluids may include oils or glycol-based solutions. Some organics may be unstable and therefore unsuitable for the application due to operating temperatures.

In passing through the air pre-heater 312 the temperature of the compressed air 313 is elevated to effect oxygen separation when it passes into the ASU 310. The ITM operation temperature is achieved by heating the air stream 313 in the air pre-heater 312 with one or more heat sources, including the sensible heat recovered from the hot exhaust gas 140 using the working fluid 394. The fluid 394 receives sensible heat as it circulates in the heat exchanger 342 through which the hot exhaust gas 140 flows after exiting the gas turbine 134 of the system 2. After being separated from the air 313 in the ASU 310, the resulting supply of oxygen 309 is delivered to the gasifier 308 and oxygen-depleted air 327 may, as illustrated, be delivered to the fuel line 325 for addition to the fuel mixture 328. Although not shown, the syngas cooler 318 may include an additional heat exchanger to generate steam from a portion of the feed-water 167 exiting the steam turbine system 4.

With the cooled gas 140 exiting the heat exchanger 342 of the heat exchange system 11 still relatively hot, it is directed to the HRSG 3 for further recovery of heat. The exhaust gas 140, being further cooled after flowing through the HRSG 3, is then discharged to atmosphere via a stack 156.

Figure 4:
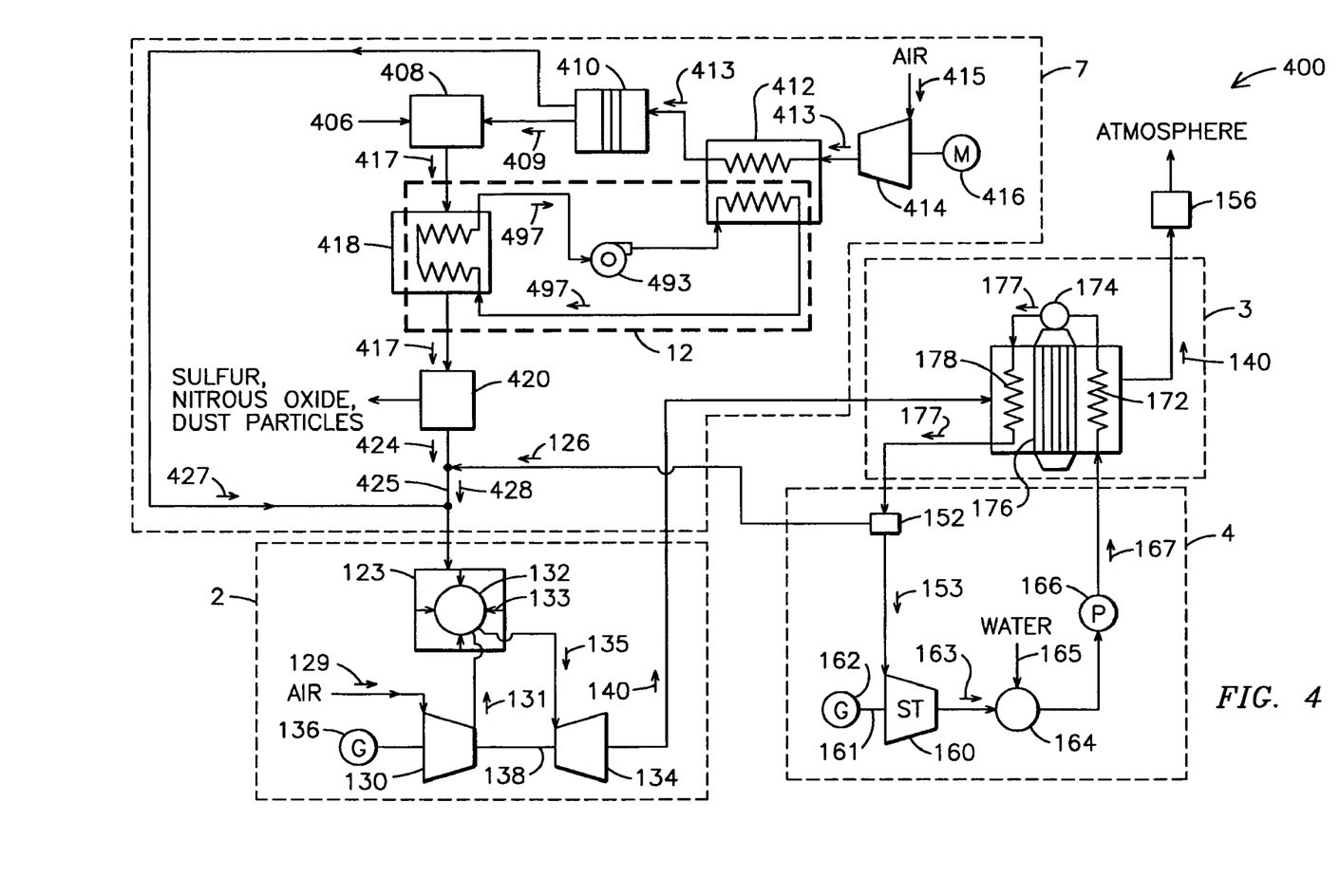

In the embodiment of FIG. 4 a power generation system 400 provides a method of pre-heating compressed air prior to entering an ASU with a closed-loop heat exchange system using an intermediate working fluid heated by hot syngas. The system 400 comprises a gas turbine system 2, a HRSG 3, a steam turbine system 4 as described with respect to FIG. 1, and a gasification system 7. The gasification system 8 includes a gasifier 408 which receives a fuel source 406 and an oxygen supply 409 from an ITM ASU 410 and generates syngas. Hot syngas 417 exiting the gasifier 408 is cooled in a syngas cooler 418 using a heat exchange working fluid 497 prior to entering a gas cleaning stage 420 for removal of impurities, e.g., sulfur, nitrous compounds, and dust particles. The cleaned syngas 424 is mixed with steam 126 from the steam chest 152 to form a fuel mixture 428 which flows through a fuel supply line 425 to the manifold 123 and into the gas combustor 132 of the gas turbine system 2.

In the gasification system 7 a compressor 414, driven by a motor 416, provides compressed air 413 from a source of ambient air 415. The compressed air 413 may be delivered from the stand-alone compressor 414 shown in FIG. 4, or from a compressor 130 of the gas turbine system 2, or from another source. In the heat exchange system 12, the compressed air 413 flows through an additional heat exchanger, air pre-heater 412, for heat exchange with the hot working fluid 497 returning from the syngas cooler 418. The syngas cooler 418 and the pre-heater 412 are coupled so that the working fluid 497 circulates in a closed-loop between the air pre-heater 412 and the syngas cooler 418 with assistance of a pump 493. In passing through the air pre-heater 412 the temperature of the compressed air 413 is elevated to the ITM operating temperature of the ASU 410. The membrane operating temperature is achieved by heating the air stream 413 in the air pre-heater 412 with one or more heat sources, including the sensible heat recovered from the hot syngas 417 exiting the gasifier 408 using the working fluid 497. After being separated from the air 413 in the ASU 410, the resulting oxygen supply 409 is delivered to the gasifier 408 and oxygen-depleted air 427 may, as shown, be delivered to the fuel line 425 for addition to the fuel mixture 428. Although not shown, the syngas cooler 418 may include an additional heat exchanger to generate steam from a portion of the feed-water 167.

Figure 5:
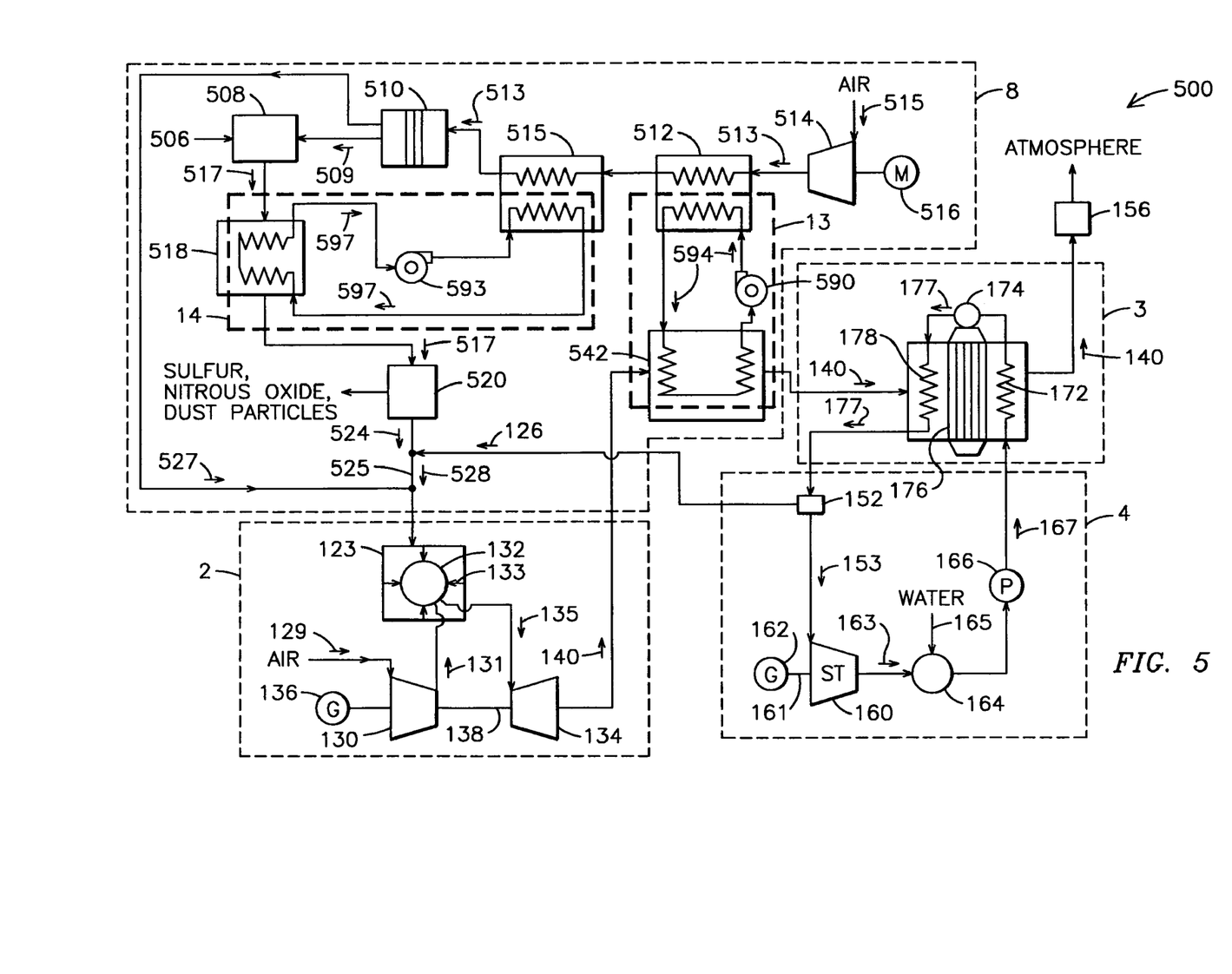

In the embodiment of FIG. 5 a power generation system 500 provides a method of pre-heating compressed air prior to entering an ASU with two closed-loop heat exchange systems recovering sensible heat from hot syngas and hot gas turbine exhaust. The system 500 comprises a gas turbine system 2, a HRSG 3, a steam turbine system 4 as described with respect to FIG. 1, and a gasification system 8. The gasification system 8 includes a gasifier 508 which generates hot syngas in an exothermic reaction of a fuel source 506 and an oxygen supply 509 from an ITM ASU 510. Syngas 517 exiting the gasifier 508 is cooled in a syngas cooler 518 prior to entering a gas cleaning stage 520 for removal of impurities, e.g., sulfur, nitrous compounds, and dust particles. The cleaned syngas 524 is mixed with steam 126 from the steam chest 152 to form a fuel mixture 528 which flows through a fuel supply line 525 to the manifold 123 and into the gas combustor 132 of the system 2.

In the gasification system 8 a compressor 514, driven by a motor 516, provides compressed air 513 from a source of ambient air 515. The compressed air 513 may be delivered from the stand-alone compressor 514 or from a compressor 130 of the gas turbine system 2, or from another source. The compressed air 513 is heated in two stages, in a first air pre-heater 512 and in a second air pre-heater 515, prior to entering the ASU 510. In the first air pre-heater 512 the compressed air 513 is heated to a pre-determined temperature by heat exchange with a first hot working fluid 594 returning from a heat exchanger 542. The fluid 594 receives sensible heat from the hot exhaust gas 140 exiting the gas turbine 134 of the system 2. The fluid 594 circulates in the closed-loop system 13 between the air pre-heater 512 and the heat exchanger 542 with assistance of a pump 590. The temperature of the compressed air 513 exiting from the first air pre-heater 512 is further raised to the ITM operation temperature when passing through the second air pre-heater 515. The temperature of the air stream 513 is elevated with one or more heat sources, including the sensible heat recovered from the hot syngas 517 exiting the gasifier 508 using a working fluid 597. The working fluid 597 circulates in a closed-loop heat exchange system 14 between the air pre-heater 515 and the syngas cooler 518 with assistance of a pump 593.

The hot compressed air 513, with its temperature raised to that required for oxygen separation, passes into the ITM ASU 510. After being separated from the air 513 in the ASU 510, the resulting supply of oxygen 509 is delivered to the gasifier 508 and oxygen-depleted air 527 may, as illustrated, be delivered to the fuel line 525 for addition to the fuel mixture 528. The cooled gas 140 exiting the heat exchanger 542, still relatively hot, is directed to the HRSG 3 for further recovery of heat. The gas 140, being further cooled after flowing through the HRSG 3, is then discharged to atmosphere via a stack 156. Although not shown, the syngas cooler 518 may include an additional heat exchanger to generate steam from a portion of the feed-water 167.

While example embodiments of the invention have been illustrated, the invention is not so limited. Numerous modifications, changes, variations, substitutions and equivalents will be apparent to those skilled in the art without departing from the spirit and scope of the invention as described in the claims.

The invention claimed is:

1. An integrated gasification combined cycle power generation system, comprising:
    a gasifier configured to generate synthetic gas from a carbonaceous material and an oxygen supply;
    a first heat exchanger configured to receive the synthetic gas;
    a second heat exchanger coupled to the first heat exchanger in a closed loop to circulate a first working fluid whereby the first working fluid can receive sensible heat from the synthetic gas and transfer the sensible heat to a first air supply;
    a first compressor for generating the first air supply;
    a gas turbine combustion system including a turbine configured to receive fuel from the gasifier and a second air supply from a second air compressor;
    a steam turbine system configured to generate power with heat recovered from exhaust generated by the gas turbine system;
    a third heat exchanger configured to flow the first air supply therethrough and receive sensible heat from exhaust generated by the gas turbine system;
    a fourth heat exchanger, coupled to the third heat exchanger in a closed loop to circulate a second working fluid whereby the second working fluid can receive sensible heat from the exhaust and transfer the sensible heat to the first air supply; and
    an ion transport membrane air separation unit configured to receive the first air supply after transfer of sensible heat to the first air supply from synthetic gas and exhaust gas.

2. The system of claim 1 wherein the air separation unit is configured to provide the oxygen supply to the gasifier.

3. An integrated gasification combined cycle power generation system, comprising:
    a gasifier configured to generate synthetic gas from a carbonaceous material and an oxygen supply;
    a cleaning stage positioned to receive synthetic gas from the gasifier and remove impurities therefrom;
    a gas turbine combustion system including a turbine configured to receive fuel from the gasifier and a first air supply from a first air compressor;
    a steam turbine system configured to generate power with a first working fluid using heat recovered from exhaust generated by the gas turbine system;
    an ion transport membrane air separation unit including a second air compressor for generating a second air supply for separation of oxygen therefrom; and
    a first heat exchanger, coupled to receive exhaust gas from the gas turbine and to transfer sensible heat in a heat exchange loop, received directly from the exhaust gas of the gas turbine combustion system, to the second air supply prior to the separation of oxygen therefrom wherein the first heat exchanger is designed to transfer sensible heat to the second air supply with a second working fluid in the heat exchange loop separate from the first working fluid.

4. The system of claim 3, further including a heat recovery steam generator coupled to receive the gas turbine exhaust gas for transfer of sensible heat from the exhaust gas to the heat recovery steam generator after the exhaust gas passes through the first heat exchanger.

5. A method for generating an oxygen supply in an integrated gasification combined cycle power generation system, comprising:

provibing a gasifier configured to generate synthetic gas from a carbonaceous material and an oxygen supply;

cleaning the synthetic gas to remove impurities;

generating a first air supply from a first compressor;

combusting the synthetic gas with the first air supply to create a hot exhaust;

elevating the temperature of a first working fluid using heat recovered from the hot exhaust generated from the synthetic gas;

generating a second air supply from a second compressor;

providing the oxygen supply by passing the second air supply through an ion transport membrane air separation unit; and elevating the temperature of the second air supply by transferring sensible heat in a heat exchange loop, extracted from the synthetic gas prior to cleaning and combusting the synthetic gas, to the second air supply with a second working fluid in the heat exchange loop separate from the first working fluid.

6. The method of claim 5 wherein the integrated gasification combined cycle power generation system includes a steam turbine and the method further includes applying the first working fluid to generate power in the steam turbine.

* * * * *